(12) United States Patent
Yenna et al.

(10) Patent No.: US 11,280,659 B2
(45) Date of Patent: Mar. 22, 2022

(54) REFLECTOR FOR RADAR-BASED FILL LEVEL DETECTION

(71) Applicant: Endress+Hauser SE+Co. KG, Maulburg (DE)

(72) Inventors: Trevor Yenna, Greenwood, IN (US); Eugene E. Henry, Indianapolis, IN (US)

(73) Assignee: ENDRESS+HAUSER SE+CO. KG, Maulburg (DE)

( * ) Notice: Subject to any disclaimer, the term of this patent is extended or adjusted under 35 U.S.C. 154(b) by 124 days.

(21) Appl. No.: 16/549,529

(22) Filed: Aug. 23, 2019

(65) Prior Publication Data
US 2021/0055151 A1  Feb. 25, 2021

(51) Int. Cl.
G01F 23/292 (2006.01)
G01F 25/00 (2022.01)

(52) U.S. Cl.
CPC ...... *G01F 23/2928* (2013.01); *G01F 25/0061* (2013.01)

(58) Field of Classification Search
CPC .................................................. G01F 23/2928
See application file for complete search history.

(56) References Cited

U.S. PATENT DOCUMENTS

| | | | | |
|---|---|---|---|---|
| 2,793,362 A | * | 5/1957 | Oberg | G01S 13/75 342/6 |
| 3,039,093 A | * | 6/1962 | Rockwood | H01Q 15/18 342/7 |
| 3,153,235 A | * | 10/1964 | Chatelain | H01Q 15/18 342/8 |
| 3,200,400 A | * | 8/1965 | Gill, Jr. | H01Q 15/18 342/7 |
| 3,365,790 A | * | 1/1968 | Brauer | G02B 5/124 29/600 |

(Continued)

FOREIGN PATENT DOCUMENTS

| | | | |
|---|---|---|---|
| CN | 108631064 A | * | 10/2018 |
| CN | 209001143 U | * | 6/2019 |

(Continued)

OTHER PUBLICATIONS

Christian Wolf, Corner reflectors or Radar reflectors, radartutorial. eu (Year: 2017).*

(Continued)

*Primary Examiner* — John Fitzgerald
(74) *Attorney, Agent, or Firm* — Christopher R. Powers; Endress+Hauser(USA) Holding, Inc.

(57) ABSTRACT

The present disclosure relates to reflector for non-contact radar-based fill level measurement in containers with floating roofs. The reflector is designed to be mounted on top of the floating roof, wherein the reflector comprises at least a surface, which is formed by an array of cavities. According to the present disclosure, the cavities have a tapered cross-section. By the tapered cavities the radar signals emitted by the fill level measuring device are reflected and focused towards the fill level measuring device, so that the receipt of the reflected radar signal by the fill level measuring device is ensured. Through this, the fill level measuring device can determine the fill level reliably based on the reflected radar signals.

18 Claims, 2 Drawing Sheets

(56) References Cited

U.S. PATENT DOCUMENTS

| | | | | |
|---|---|---|---|---|
| 3,541,553 A * | 11/1970 | Samuel | H04B 7/2041 | 342/353 |
| 3,689,346 A * | 9/1972 | Rowland | B29C 35/10 | 156/245 |
| 3,810,804 A * | 5/1974 | Rowland | G02B 5/124 | 156/245 |
| 3,811,983 A * | 5/1974 | Rowland | G02B 5/124 | 156/245 |
| 3,833,285 A * | 9/1974 | Heenan | G02B 5/124 | 359/551 |
| 4,096,479 A * | 6/1978 | Van Buskirk | H01Q 15/18 | 342/7 |
| 4,176,355 A * | 11/1979 | Harris | H01Q 15/18 | 342/7 |
| 4,531,128 A * | 7/1985 | Mensa | H01Q 15/18 | 342/7 |
| 4,551,726 A * | 11/1985 | Berg | H01Q 15/18 | 342/7 |
| 4,612,473 A * | 9/1986 | Nilssen | F21V 7/28 | 313/111 |
| 4,618,518 A * | 10/1986 | Pricone | G02B 5/124 | 359/530 |
| 4,695,841 A * | 9/1987 | Billard | H01Q 15/18 | 342/8 |
| 4,733,236 A * | 3/1988 | Matosian | H01Q 15/18 | 342/169 |
| 4,785,301 A * | 11/1988 | Schafer | H01Q 15/18 | 342/7 |
| 4,823,131 A * | 4/1989 | Bell | H01Q 15/18 | 114/326 |
| 5,097,265 A * | 3/1992 | Aw | H01Q 15/18 | 342/7 |
| 5,179,382 A * | 1/1993 | Decker | H01Q 15/18 | 342/8 |
| 5,614,831 A * | 3/1997 | Edvardsson | G01F 23/284 | 324/642 |
| 6,054,963 A * | 4/2000 | Muterspaugh | H01Q 9/44 | 343/741 |
| 6,340,956 B1 * | 1/2002 | Bowen | H01Q 15/161 | 343/840 |
| 6,684,697 B1 * | 2/2004 | Westerling | G01F 23/284 | 343/872 |
| 6,940,464 B2 * | 9/2005 | Petersson | H01Q 3/2658 | 343/781 P |
| 7,532,155 B2 * | 5/2009 | Kleman | G01F 23/284 | 342/1 |
| 7,712,904 B2 * | 5/2010 | Benson | G02B 5/124 | 359/529 |
| 8,040,274 B2 * | 10/2011 | Wendler | G01F 23/284 | 342/124 |
| 8,061,552 B2 * | 11/2011 | Hiner | B65D 88/40 | 220/811 |
| 8,350,752 B2 * | 1/2013 | Hemmendorff | G01F 23/284 | 342/124 |
| 9,124,004 B2 * | 9/2015 | Rard | H01Q 15/18 | |
| 9,638,843 B2 * | 5/2017 | Katano | G02B 5/124 | |
| 10,384,866 B2 * | 8/2019 | Joosten | G01F 23/284 | |
| 10,725,160 B2 * | 7/2020 | Larsson | G01S 13/02 | |
| 10,840,601 B2 * | 11/2020 | Ochiai | H01Q 21/0031 | |
| 2003/0107528 A1 * | 6/2003 | Takemoto | H01Q 21/061 | 343/912 |
| 2007/0242334 A1 * | 10/2007 | Selbrede | G02B 6/2852 | 359/222.1 |
| 2007/0261487 A1 * | 11/2007 | Sintes | G01F 23/2962 | 73/290 V |
| 2011/0083504 A1 * | 4/2011 | Unger | G01F 23/30 | 73/304 C |
| 2012/0007768 A1 * | 1/2012 | Hemmendorff | G01F 23/284 | 342/124 |
| 2013/0120155 A1 * | 5/2013 | Hagg | B65D 88/34 | 340/870.01 |
| 2013/0153573 A1 * | 6/2013 | Ben Afeef | B65D 88/34 | 220/219 |
| 2013/0300594 A1 * | 11/2013 | Rard | H01Q 15/18 | 342/7 |
| 2014/0034640 A1 * | 2/2014 | Riordan | A62C 3/065 | 220/88.1 |
| 2016/0031636 A1 * | 2/2016 | Burn | B29C 44/42 | 428/66.4 |
| 2016/0229627 A1 * | 8/2016 | Joosten | B65D 88/34 | |
| 2017/0121103 A1 * | 5/2017 | Ellis | B65D 88/40 | |
| 2017/0284796 A1 * | 10/2017 | Gerding | G01F 23/284 | |
| 2017/0302001 A1 * | 10/2017 | Serneby | H01Q 19/106 | |
| 2017/0373752 A1 * | 12/2017 | Rains | H04B 10/116 | |
| 2018/0278328 A1 * | 9/2018 | Rains, Jr. | H04N 5/3765 | |
| 2018/0292519 A1 * | 10/2018 | Larsson | G01F 23/284 | |
| 2018/0372531 A1 * | 12/2018 | Waelde | H01Q 1/225 | |
| 2019/0056541 A1 * | 2/2019 | Roberts | G02B 5/136 | |
| 2019/0128728 A1 * | 5/2019 | Fredriksson | G01F 23/284 | |
| 2019/0225810 A1 * | 7/2019 | Kuzuu | G01S 7/03 | |
| 2021/0080310 A1 * | 3/2021 | Frovik | B65D 90/48 | |

FOREIGN PATENT DOCUMENTS

| | | | |
|---|---|---|---|
| CN | 111326863 A | * | 6/2020 |
| CN | 212723311 U | * | 3/2021 |

OTHER PUBLICATIONS

Algafsh et al. "The Effect of Perforating the Corner Reflector on Maximum Radar Cross Section," IEEE (Year: 2016).*

* cited by examiner

REFLECTOR FOR RADAR-BASED FILL LEVEL DETECTION

TECHNICAL FIELD

The present disclosure relates to non-contact radar-based fill level detection systems, particularly to such systems employed in containers with floating roofs.

BACKGROUND

In process automation technology, field devices are generally used to detect or influence various types of process variables. For this purpose, the respective types of field devices are based on appropriate measuring principles to measure and record the corresponding process variables, such as level, flow, pressure, temperature, pH value, redox potential or conductivity. Various types of such field device types are manufactured and distributed by Endress+Hauser.

For measuring the level of a medium in containers, non-contact radar-based measuring methods have become established, at least in part because they are robust and require relatively little maintenance. A main advantage of radar-based measuring methods is the ability to measure the level continuously. In this context, the term "radar" generally refers to radar signals with frequencies between 1 GHz and 100 GHz. For example, common frequency bands where level measurement is performed are 2 GHz, 6 GHz, 26 GHz or 79 GHz.

For radar-based level measurement, the pulse travel-time principle constitutes an established measuring principle. According to this measuring principle, pulse-shaped radar signals are cyclically emitted towards the medium. Subsequently, the travel-time between the emission and the reception of the corresponding reflected radar signal is measured. Fill level measurement devices, which are based on this principle, can be realized with only little circuit complexity.

If more complex circuit designs are available, FMCW ("Frequency Modulated Continuous Wave") can be implemented as a measuring principle for radar-based fill level measurement. According to this principle, the radar signals are emitted continuously. In such an implementation, the frequency of the radar signal is not constant and changes periodically within the specified frequency band. For example, at a center frequency of 79 GHz, the frequency band may range from 78 GHz to 80 GHz.

With FMCW, often the frequency-shift is linear and has a sawtooth or triangular shape. In principle, a sine-shaped frequency-shift can be implemented. In contrast to the pulse travel-time method, the distance or the fill level is determined on the basis of the instantaneous frequency difference between the current received signal and the instantaneously transmitted microwave signal in case of FMCW. The measuring principles of FMCW and the pulse trave-time method are described in "Radar Level Detection, Peter Devine, 2000," for example.

Both measuring principles, FMCW and the pulse travel-time principle, require that the medium inside the container reflects the radar signals appropriately. An exception to this is mediums stored in containers that have a floating roof, specifically, for example, in applications for gaseous or liquid fuels. In such cases, it is the floating roof that triggers the refection of the radar signals, since the floating roof covers the surface of the medium. However, in practice the floating roof might be uneven, curved, not level, or made of a radar-absorbing material. Such conditions can possibly inhibit a proper reflection of the radar signals so that the fill level cannot be determined.

Accordingly, there remains a need for further contributions in this area of technology.

SUMMARY

An object of this present disclosure is to provide a reliable radar-based fill level detection in containers with floating roofs. This object is obtained by a reflector for non-contact radar-based fill level measurement devices. The reflector of the present disclosure includes at least a surface, which is formed by an array of cavities. According to an embodiment of the present disclosure, the cavities have a tapered cross-section, wherein the taper is preferably designed with an angle of between 30° and 60°. By the tapered cavities, the radar signals are focused towards the fill level measuring device such that detection of the reflected radar signals by the fill level measuring device is ensured.

In the context of the present disclosure, the term "unit" may include any electronic circuit that is configured appropriately for the respective purpose. Depending on the requirements of a given application, the respective unit can therefore be based on an analog circuit for generating or processing corresponding analog signals. Nonetheless, the unit may be a digital circuit such as a field programmable gate array ("FPGA") or a storage medium in cooperation with a program. In such an embodiment, the program is configured to perform the corresponding method steps or to apply the necessary arithmetic operations of the respective unit. In this context various electronic units can in principal rely on a common physical memory or be operated by means of the same physical digital circuit.

Regarding the reflector of the present disclosure, the contour of the cavities is not restricted to a certain shape. In various embodiments, the cavities may have a trapezoidal, hexagonal or triangular contour, or a combination thereof. In at least one embodiment, the cavities can be arranged such that the array of cavities forms a comb-type structure when the cavities all have the same type of contour and the same size. However, the reflector can even be realized without a comb type array of cavities, where not all the cavities are the same type or have the same size of contour, for instance.

The material from which the reflector is made may be any material capable of reflecting the radar signals of the fill level measuring device at least partially. Therefore, the cavities of the reflector can be made of a plastic material, for instance. However, to further increase the reflection of the radar signals, the surface of the reflector can be coated with an electrically conductive material, or the cavities can be made of an electrically conductive material like a metal or a conductive plastic material.

In principle, manufacturing of the reflector is not restricted to a certain manufacturing process. If the array is made of a plastic material, a suitable manufacturing process for the reflector may include forming single cavities via plastic molding and subsequently joining the cavities to form a comb-type array. In at least one embodiment, the whole array may be plastic molded as a single component. In a further embodiment, the array can optionally be fixed by means of a frame, in particular a stainless steel frame, for instance.

The reflector may be mounted on a floating roof inside a container such that the surface comprising the cavities is oriented towards the top of the container. In this context it is advantageous if the offset between the reflector and the surface of the medium is minimized as much as possible. Accordingly, in an embodiment, the cavities have a depth of about 6 inches or less.

Upon placement of the reflector inside the container, a corresponding radar-based fill level measuring device can be mounted on top of the container for non-contact measurement of the fill level of a gaseous or liquid medium in the container. The fill level measuring device may be of any non-contact type, including but not limited to FMCW radar, pulse travel-time radar and ultrasonic transducer devices. For suitable measurement, the fill level measuring device includes: an emitter-unit, which is embodied to send radar signals, in particular with a frequency of 1 GHz or greater, towards the reflector; a receiver for receiving the reflected radar signals after being reflected by the reflector; and a processing unit for determining the fill level using the reflected radar signals. Accordingly, embodiments of the present disclosure include a reflector according to one of the preceding embodiments and an aforementioned radar-based fill level measuring device.

BRIEF DESCRIPTION OF THE DRAWINGS

The present disclosure will now be explained based on the appended drawing, the figures of which include.

DETAILED DESCRIPTION

Figure 1:
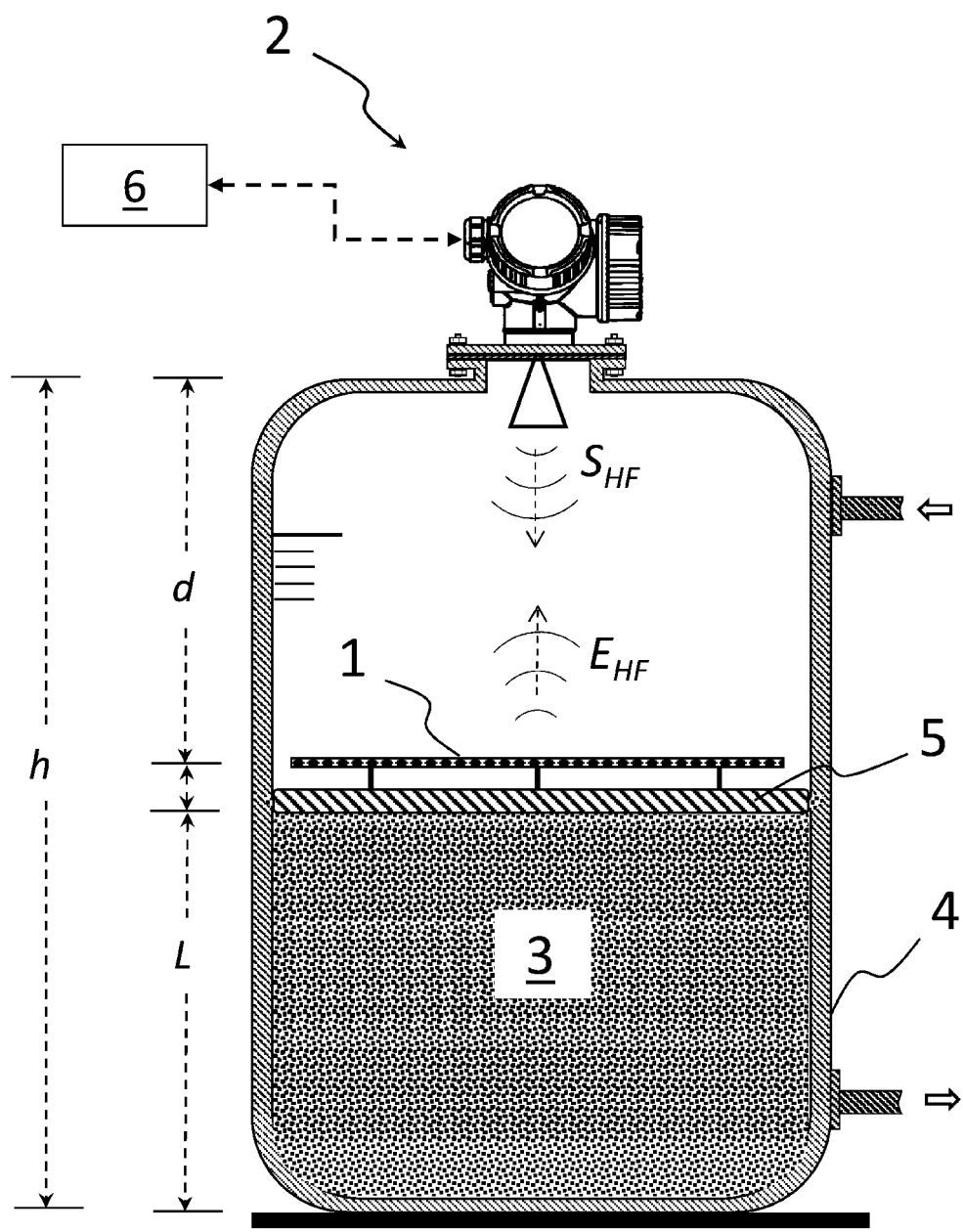
FIG. 1 shows a conventional arrangement of a radar-based fill level measurement device on a container with a floating roof.

For a basic understanding of the present disclosure, an installation of a radar-based fill level measuring device 2, which is mounted on a container 4, is shown in FIG. 1. Inside the container 4 a medium 3 is stored, whose fill level may be determined by the fill level measuring device 2. Depending on the type of container 4, the fill level measuring device 2 may be installed more than 300 feet above the bottom of the container 2. The container 4 shown in FIG. 1 includes a floating roof 5 suitable for the storage of a gaseous or liquid medium 3, like a fuel, for example.

According to the working principle of the floating roof 5, its vertical position is defined by the fill level L of the medium 3. Through this, the fill level measuring device 2 can determine the fill level L by measuring the distance d to the floating roof 5 via the formula d=L−h−x, wherein x describes the offset caused by the height of the floating roof 5.

To measure the distance d to the floating roof 5, the fill level measuring device 2 is aligned with the container 4 such that radar signals $S_{HF}$ are emitted towards the floating roof 5. Depending on the type of fill level measuring device, an emitter-unit of the radar-based fill level measuring device 2 produces the radar signals $S_{HF}$ either according to the pulse travel-time principle or the FMCW principle. In either case, the radar signals $S_{HF}$ may be generated with a frequency of 1 GHz or greater. In alternative implementations of the reflector 1, the fill level measuring device 2 may be of any non-contact type, including but not limited to FMCW radar, pulse travel-time radar and ultrasonic transducer devices, in which case an emitter-unit of the fill level device 2 may generate and emit an ultrasonic signal $S_{HF}$.

After emitting the radar signal $S_{HF}$, a corresponding reflected radar signal $E_{HF}$, which is reflected from the top of the floating roof 5, is received by a receiver of the fill level measuring device 2 after a defined travel time. The travel time, in turn, depends on the distance d and the constant speed of electromagnetic waves. For both, sending and receiving the radar signals $S_{HF}$ the fill level measuring device 2 may include one single horn antenna, which is connected to the receiver and the emitter unit, as shown in FIG. 1. By measuring the travel time of the radar signals $S_{HF}$, $E_{HF}$, the fill level measuring device 2 determines the distance d.

Commonly the fill level measuring device 2 is connected to a superordinate unit 6, such as a process control system, a decentralized database or a handheld device via an interface, which is based on a corresponding bus system like "Ethernet", "PROFIBUS", "HART" or "Wireless HART". On the one hand the value of the fill level L can be transmitted to the superordinate unit 6. Furthermore, general information about the operating state of the fill level measuring device 2 can be communicated via this interface.

Depending on the type of floating roof 5, there arises the risk that the floating roof 5 absorbs the emitted radar signal $S_{HF}$, that the reflected radar signals $E_{HF}$ are reflected too diffusely, or that the floating roof 5 is not level or flat enough to reflect the reflected radar signals $E_{HF}$ directly toward the fill level measuring device 2. In such cases the reflected radar signal $E_{HF}$ may be too weak to be detected by the receiver of the fill level measuring device 2 such that the fill level L cannot be determined. To avoid this problem, according to the present disclosure, a reflector 1 can be implemented in combination with the fill level measuring device 2. The reflector 1 may be mounted on top of the floating roof 5 inside the container 4 to ensure adequate reflection of the emitted radar signals $S_{HF}$ for accurate determination of the fill level L.

Figure 2:
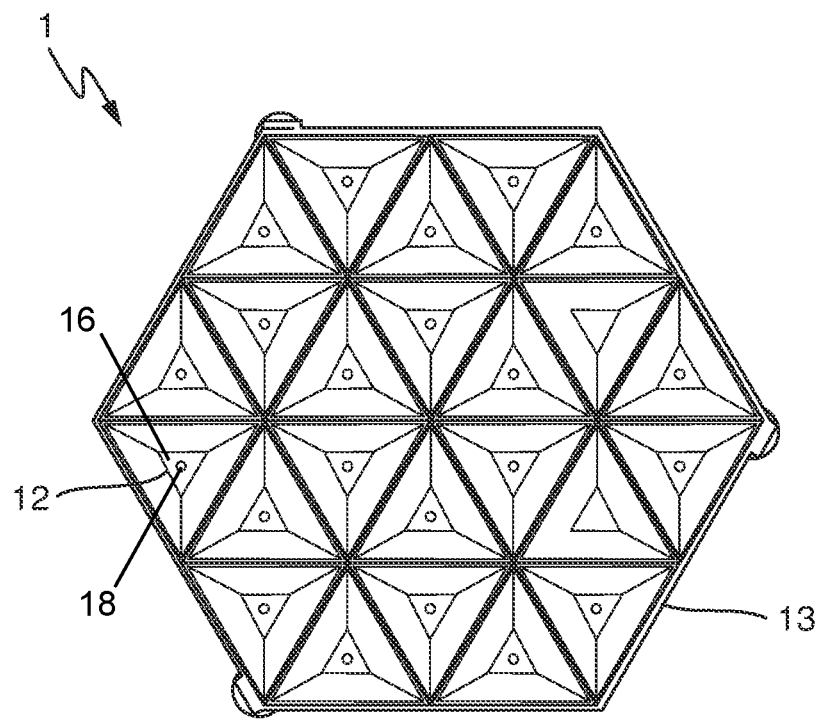
FIG. 2 shows a top view of a reflector of the present disclosure.
Figure 3:
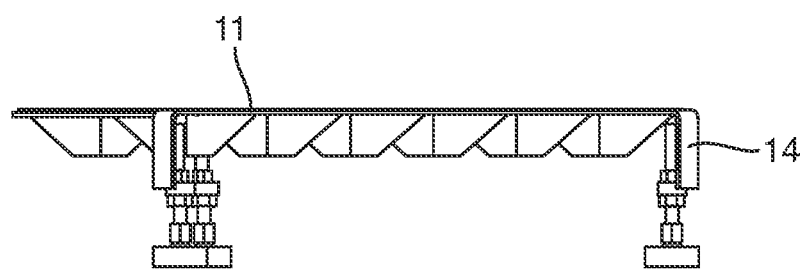
FIG. 3 shows a side view of the reflector.

The structure of the reflector 1, according to at least one embodiment of the present disclosure, is depicted in FIG. 2 and FIG. 3 in greater detail. As shown in FIGS. 2 and 3, the reflector 1 includes a surface 11, which includes a plurality of cavities 12 formed therein. To orientate the surface 11 of the reflector 1 at least partially toward the fill level measuring device 2 such that the reflector 1 reflects the radar signal $S_{HF}$ towards the fill level measuring device 2, the reflector 1 may be connected to at least one mounting support 14, which may be adjustable in certain embodiments. In an embodiment, the at least one mounting support 14 may include three adjustable legs with feet, as shown in FIG. 3. In a further embodiment, the at least one mounting support 14 may include any number of feet, legs, posts or the like, including adjustable ones.

The surface 11 may be formed by an array of cavities 12. In certain embodiments, the cavities 12 may have a triangular contour (i.e., perimeter), all with the same dimension, as shown in FIG. 2. The contour of each cavity is defined by the shape of each cavity along a horizontal plane through the reflector 1. Furthermore, the cavities 12 may be arranged in such a conjoined manner that the array forms a comb-type structure. As will be appreciated by one of skill in the art having the benefit of the present disclosure, the shape and the number of the cavities 12 may be chosen in dependency of the desired overall size of the reflector 1. In addition to the triangular contour depicted in FIG. 2 and FIG. 3, the contour of the cavities 12 may alternatively have a trapezoidal or hexagonal shape in certain embodiments of the present disclosure. In the embodiment of FIG. 2 and FIG. 3, the cavities 12 have a triangular contour. However, in alternative embodiments a trapezoidal or hexagonal contour the array of cavities 12 could be realized in a comb-type manner.

Efficient and sufficient reflection of the radar signals $S_{HF}$, $E_{HF}$ from the reflector 1 is ensured by a tapered cross-section of the cavities 12, as illustrated in FIG. 2 and FIG. 3. Because of the tapered cross-section of the cavities 12, the reflected radar signals $E_{HF}$ are directed towards the fill level measuring device 2. In FIG. 3, the taper of the cavities 12 of the reflector 1 has an angle of approximately 45°. In further embodiments, the angle can be formed between 30° and 60° in the context of the present disclosure. Instead of a straight taper, as illustrated in FIG. 2 and FIG. 3, alternatively a convex or concave taper in cross-section can be implemented according the present disclosure.

In an embodiment, the tapered cavities 12 may be truncated by a floor surface 16 and have a depth t of approximately 2 inches such that the shape of the cavities 12 defines a frustum of a triangular pyramid. At the bottom of each frustum, a hole 18 in the floor surface 16, as shown in FIG. 2, may be formed to drain any incoming or condensed liquids or moisture from the reflector 1. The length of the mounting support 14 can be adjusted to the depth t of the cavities 12 such that the offset x between the reflector 1 and the surface of the medium 3 is minimized. Therefore, in certain embodiments, the cavities 12 may be formed with a depth t of less than 6 inches.

In certain applications of the reflector 1, the floating roof 5 upon which the reflector 1 is seated may not be perpendicular to the fill level measuring device 2, and particularly the emitted radar signal $S_{HF}$. For example, the floating roof 5 may be titled, bowed or canted relative to the fill level measuring device 2. Alternatively, the floating roof 5 may be intentional curved to facilitate run-off of condensation, for example, and/or for added structure rigidity. In such implementations, the adjustable mounting supports 14 may be adjusted to at least partially correct for the curvature or angle of the floating roof 5 relative to the fill level measuring device 2, thereby disposing the reflector 1 at least approximately perpendicular to the fill level measuring device 2 and the emitted radar signal $S_{HF}$. Further, the mounting support 14 enables the reflector 1 to be attached to the floating roof 5 by various methods, including but not limited to welding, fasteners such as screws or bolts, adhesives such as epoxy, or magnets where the floating roof 5 is a ferrous metal.

The material of which the reflector 1 is made reflects the radar signals $S_{HF}$, $E_{HF}$. In an embodiment, the cavities 12 can be made of a plastic material, for instance. However, to further increase the reflectivity, the surface 11 can be coated with an electrically conductive material, or the cavities 12 can be made of an electrically conductive material like a metal or a conductive plastic material.

In principle, manufacturing of the reflector 1 is not restricted to a certain manufacturing process. The cavities 12 can either be produced as individual pieces, or the whole array can be manufactured as a single component, for instance. If the cavities 12 are made of plastic, the whole array or the individual cavities 12 can be manufactured via plastic molding, for example. In an embodiment having individual cavities 12, the cavities 12 are assembled and may be joined to form a comb-type array. In an embodiment, the individual cavities 12 may include complementary indentations, which enable mechanical interlocking of the individual cavities 12. In further embodiments, the individual cavities 12 may be welded together in assembly by sonic, vibration or heat welding, as non-limiting examples. In yet a further embodiment, the array of cavities 12 can be fixed by an outer frame 13, for example, a stainless steel frame, for supporting and protecting the reflector 1 against damage at the edges of the array. In such an embodiment, the mounting support 14 may be connected to the frame 13.

The invention claimed is:

1. A reflector for a non-contact radar-based fill level measurement device, the reflector comprising:
    a surface defined by an array of a plurality of cavities arranged relative to a plane, wherein each of the plurality of cavities is configured as a frustum, including a floor surface parallel to the plane, and has a tapered cross-section in a direction perpendicular to the plane; and
    at least one mounting support configured to orient the surface at least partially toward a fill level measurement device while the reflector is seated on a floating roof of a container,
    wherein the plurality of cavities are made of an electrically conductive plastic material.

2. The reflector of claim 1, wherein each of the plurality of cavities has a trapezoidal, hexagonal or triangular contour relative to the plane.

3. The reflector of claim 1, wherein the tapered cross-section of the cavities is tapered at an angle of between 30° and 60°.

4. The reflector of claim 1, wherein the cavities have a depth of no more than 6 inches.

5. The reflector of claim 1, wherein the array of cavities is a single, integral piece.

6. The reflector of claim 1, wherein the at least one mounting support is adjustable.

7. The reflector of claim 1, wherein the floor surface includes a hole therethrough adapted as a drain.

8. The reflector of claim 1, wherein all cavities have an identical contour relative to the plane.

9. The reflector of claim 8, wherein the cavities are arranged such that the array forms a comb-type structure.

10. A method of manufacturing a reflector for a non-contact radar-based fill level measurement device, the method comprising:
    forming a plurality of individual cavities via plastic molding, wherein each of the plurality of cavities is configured as a frustum, including a flat floor surface, and has a tapered cross-section relative to the floor surface;
    connecting the plurality of cavities to form a comb-type array of cavities; and
    fixing the array to a frame, the frame including at least one mounting support configured to orient the array of cavities at least partially toward a fill level measurement device while seated on a floating roof of a container.

11. The method of claim 10, wherein the frame is made of stainless steel.

12. The method of claim 10, wherein each of the plurality of cavities has a trapezoidal, hexagonal or triangular contour relative to a horizontal plane.

13. The method of claim 10, wherein the tapered cross-section of the cavities is tapered at an angle of between 30° and 60°.

14. A system for non-contact radar-based measurement of a fill level of a gaseous or liquid medium in a container with a floating roof, the system comprising:
    a reflector including a surface defined by an array of a plurality of cavities arranged relative to a plane, wherein each of the plurality of cavities is configured as a frustum, including a floor surface parallel to the plane, and has a tapered cross-section in a direction perpendicular to the plane, and at least one mounting support configured to orient the surface at least partially toward a fill level measurement device while seated on a floating roof, wherein the reflector is disposed on top of the floating roof, and wherein the plurality of cavities are made of an electrically conductive plastic material; and a radar-based fill level measurement device disposed at or near a top of the container, the measurement device including:

an emitter-unit configured to emit radar signals towards the reflector;

a receiver configured to receive reflected radar signals generated by reflection of the emitted radar signals from the reflector; and a processing unit configured to determine the fill level based on the reflected radar signals, wherein the surface of the reflector is oriented towards the measurement device, thereby enabling receiving the reflected radar signals.

15. The system of claim 14, wherein the reflector is attached to the floating roof via the at least one mounting support by welding, a fastener, an adhesive or a magnet.

16. The system of claim 14, wherein each of the plurality of cavities has a trapezoidal, hexagonal or triangular contour relative to a horizontal plane.

17. The system of claim 14, wherein the tapered cross-section of the cavities is tapered at an angle of between 30° and 60°.

18. The system of claim 14, wherein the floor surface includes a hole therethrough adapted as a drain.

* * * * *